US012783258B2

(12) United States Patent
Fu et al.

(10) Patent No.: US 12,783,258 B2
(45) Date of Patent: Nov. 3, 2026

(54) CLOUD APPLICATION CONFIGURATION METHOD, ELECTRONIC DEVICE AND STORAGE MEDIUM

(71) Applicant: CLOUD INTELLIGENCE ASSETS HOLDING (SINGAPORE) PRIVATE LIMITED, Singapore (SG)

(72) Inventors: Zhichao Fu, Hangzhou (CN); Xiaolu Chu, Hangzhou (CN); Xiantao Zhang, Hangzhou (CN); Jinkui Ren, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 87 days.

(21) Appl. No.: 18/844,641

(22) PCT Filed: Mar. 1, 2023

(86) PCT No.: PCT/CN2023/078957
§ 371 (c)(1),
(2) Date: Sep. 6, 2024

(87) PCT Pub. No.: WO2023/169272
PCT Pub. Date: Sep. 14, 2023

(65) Prior Publication Data

US 2025/0190227 A1 Jun. 12, 2025

(30) Foreign Application Priority Data

Mar. 7, 2022 (CN) ........................ 202210225469.X

(51) Int. Cl.
*G06F 9/445* (2018.01)

(52) U.S. Cl.
CPC ................................ *G06F 9/44505* (2013.01)

(58) Field of Classification Search
CPC ...... G06F 9/44505; G06F 9/4451; G06F 8/61; G06F 8/63
See application file for complete search history.

(56) References Cited

U.S. PATENT DOCUMENTS

2004/0158813 A1* 8/2004 Xia ......................... G06F 9/547
717/174
2011/0302573 A1* 12/2011 Bubolz ................. G06F 15/177
717/173

(Continued)

FOREIGN PATENT DOCUMENTS

CN 105912382 A 8/2016
CN 108322490 A 7/2018

(Continued)

OTHER PUBLICATIONS

International Search Report and Written Opinion dated May 22, 2023 for International Application No. PCT /CN2023/078957.

(Continued)

*Primary Examiner* — Raymond N Phan

(57) ABSTRACT

Embodiments of the present application provide a cloud application-based processing method, an electronic device and a storage medium. The method includes: obtaining a link address of a target application; obtaining an installation file of the target application based on the link address, and making a mirror file of the target application based on the installation file; determining a proxy node of the target application based on location information of a terminal device; and deploying the mirror file of the target application to the proxy node, so as to provide a service of the target application to the terminal device based on the proxy node. Application configuring can be performed conveniently and the processing efficiency can be improved.

13 Claims, 5 Drawing Sheets

(56) References Cited

U.S. PATENT DOCUMENTS

| | | | | |
|---|---|---|---|---|
| 2012/0015074 | A1 | 1/2012 | Draganski | |
| 2012/0331460 | A1* | 12/2012 | Manahan | H04L 67/52 717/178 |
| 2014/0366093 | A1 | 12/2014 | Oh et al. | |
| 2015/0293769 | A1* | 10/2015 | Zhong | G06F 8/61 717/174 |
| 2016/0308868 | A1* | 10/2016 | Dulkin | H04L 63/10 |
| 2016/0378462 | A1* | 12/2016 | Hu | H04L 67/34 717/173 |

FOREIGN PATENT DOCUMENTS

| | | | |
|---|---|---|---|
| CN | 108958927 | A | 12/2018 |
| CN | 109672722 | A | 4/2019 |
| CN | 110855791 | A | 2/2020 |
| CN | 111917856 | A | 11/2020 |
| CN | 113360160 | A | 9/2021 |
| CN | 113656176 | A | 11/2021 |
| CN | 114721728 | A | 7/2022 |
| WO | 2021197579 | A1 | 10/2021 |

OTHER PUBLICATIONS

First Office Action dated Jan. 12, 2023 for Chinese Patent Application No. 202210225469.X.
Second Office Action dated Apr. 27, 2023 for Chinese Patent Application No. 202210225469.X.
Third Office Action dated Jul. 15, 2023 for Chinese Patent Application N. 202210225469.X.
Rejection Decision dated Oct. 14, 2023 for Chinese Patent Application No. 202210225469.X.

* cited by examiner

CLOUD APPLICATION CONFIGURATION METHOD, ELECTRONIC DEVICE AND STORAGE MEDIUM

CROSS-REFERENCE TO RELATED APPLICATIONS

This application is a National Stage of International Application No. PCT/CN2023/078957, filed on Mar. 1, 2023, which claims priority to Chinese patent application No. 202210225469.X, entitled "CLOUD APPLICATION-BASED PROCESSING METHOD, ELECTRONIC DEVICE AND STORAGE MEDIUM" and filed with the China National Intellectual Property Administration on Mar. 7, 2022, both of which are hereby incorporated by reference in their entireties.

TECHNICAL FIELD

The present disclosure relates to the field of computer technology and, in particular, to a cloud application-based processing method, an electronic device and a storage medium.

BACKGROUND

A cloud application refers to an application deployed on a server in the cloud. The server interacts with a user's terminal device to transmit operation instructions of the terminal device to the server, and the server runs the application installed on the server based on the operation instructions, and feeds back images after running to the terminal device.

The existing way to configure the cloud application is that a service provider provides an application installation file and an application mirror file, and allocates corresponding system resources, etc., to perform instantiation on the server in the cloud, and then provide services.

However, configuring the cloud application by using the above approach requires the service provider to provide the application installation file, the application mirror file and other files for configuring the cloud application, which is very troublesome.

SUMMARY

Embodiments of the present application provide a cloud application-based processing method to facilitate configuring applications.

Correspondingly, embodiments of the present application further provide a cloud application-based processing apparatus, an electronic device and a storage medium to ensure the implementation and application of the above method.

In order to solve the above problem, embodiments of the present application disclose a cloud application-based processing method, which is applied to a server side and includes:

obtaining a link address of a target application;

obtaining an installation file of the target application based on the link address, and making a mirror file of the target application based on the installation file;

determining a proxy node of the target application based on location information of a terminal device; and deploying the mirror file of the target application to the proxy node, to provide a service of the target application to the terminal device based on the proxy node.

In an implementation, the method further includes:

matching the link address of the target application to a link address in a first information library to determine first matching information, where the first information library stores link addresses of applications whose installation files have been downloaded; and extracting the installation file of the target application from a file library based on the first matching information.

In an implementation, the method further includes:

matching the link address of the target application to a link address in a second information library to determine second matching information, where the second information library stores link addresses of applications whose mirror files have been deployed; and extracting target proxy node information from a node information library based on the second matching information to determine a target proxy node, to provide the service of the target application to the terminal device based on the target proxy node.

In an implementation, the determining the proxy node of the target application based on the location information of the terminal device includes:

determining operating environment information based on application type information of the target application; and determining the proxy node of the target application based on the location information of the terminal device and the operating environment information.

Embodiments of the present application further disclose a cloud application-based processing method, which is applied to a proxy node and includes:

receiving device information of a terminal device and a mirror file of a target application from a server side, where the mirror file of the target application is determined based on an installation file of the target application, and the installation file of the target application is obtained based on a link address of the target application;

establishing a long connection between the proxy node and the terminal device based on the device information;

receiving, based on the long connection, an application operation instruction uploaded by the terminal device;

instantiating the mirror file of the target application, and determining processed image data based on the application operation instruction and the instantiated mirror file to form an image stream; and feeding back the image stream to the terminal device based on the long connection.

Embodiments of the present application further disclose a cloud application-based processing method, which is applied to a terminal device and includes:

identifying link addresses related to applications in an interactive page, to display the link addresses in a link address table;

determining a target link address of a target application based on selection information in the link address table; and uploading the target link address of the target application to a server side, so that the server side obtains an installation file of the target application based on the target link address, and makes a mirror file of the target application, so as to deploy the mirror file of the target application to a target proxy node, and provide a service of the target application to the terminal device through the target proxy node.

In an implementation, the method further includes at least one of:

uploading location information of the terminal device to the server side, so that the server side determines the target proxy node based on the location information;

uploading device information of the terminal device to the server side, so that the server side sends the device information to the target proxy node, so that the target proxy node establishes a long connection with the terminal device based on the device information, to provide the service of the target application based on the long connection.

In an implementation, the method further includes:

establishing a long connection between the terminal device and the target proxy node;

uploading an application operation instruction to the target proxy node based on the long connection, so that the target proxy node determines processed image data based on the application operation instruction and an instantiated mirror file to form an image stream; and receiving, based on the long connection, the image stream fed back by the target proxy node and displaying the image stream.

Embodiments of the present application further discloses a cloud application-based processing apparatus, which includes:

a link address obtaining module configured to obtain a link address of a target application;

a mirror file obtaining module configured to obtain an installation file of the target application based on the link address, and make a mirror file of the target application based on the installation file;

a proxy node obtaining module configured to determine a proxy node of the target application based on location information of a terminal device; and a mirror file deploying module configured to deploy the mirror file of the target application to the proxy node, to provide a service of the target application to the terminal device based on the proxy node.

Embodiments of the present application further disclose a cloud application-based processing apparatus, which includes:

a mirror file receiving module configured to receive device information of a terminal device and a mirror file of a target application from a server side, where the mirror file of the target application is determined based on an installation file of the target application, and the installation file of the target application is obtained based on a link address of the target application;

a long connection establishment module configured to establish a long connection between the proxy node and the terminal device based on the device information;

an operation instruction receiving module configured to receive, based on the long connection, an application operation instruction uploaded by the terminal device;

an image stream obtaining module configured to instantiate the mirror file of the target application, and determine processed image data based on the application operation instruction and the instantiated mirror file to form an image stream; and an image stream feedback module configured to feedback the image stream to the terminal device based on the long connection.

Embodiments of the present application further disclose a cloud application-based processing apparatus, which includes:

a link address displaying module configured to identify link addresses related to applications in an interactive page, to display the link addresses in a link address table;

a link address selecting module configured to determine a target link address of a target application based on selection information in the link address table; and a link address uploading module configured to upload the target link address of the target application to a server side, so that the server side obtains an installation file of the target application based on the target link address, and makes a mirror file of the target application, so as to deploy the mirror file of the target application to a target proxy node, and provide a service of the target application to the terminal device through the target proxy node.

Embodiments of the present application further disclose an electronic device, comprising:

a processor; and a memory having executable codes stored thereon, where when the executable codes are executed by the processor, the method as described in any one of the embodiments of the present application is implemented.

Embodiments of the present application further disclose one or more machine-readable media having executable codes stored thereon, where when the executable codes are executed by a processor, the method as described in any one of the embodiments of the present application is implemented.

Compared with the prior art, the embodiments of the present application include the following advantages.

The embodiments of the present application can be applied to the server side, and the server side can interact with the terminal device to obtain the link address of the target application from the terminal device, and then obtain the installation file of the target application based on the link address, and make the mirror file of the target application. The server side can further determine the proxy node of the target application based on the location information of the terminal device, and deploy the mirror file of the target application to the proxy node to provide the service of the target application to the terminal device based on the proxy node. The proxy node can establish a connection with the terminal device to receive an instruction for the target application from the terminal device, and perform processing based on the instruction and the mirror file of the target application to form image data and feedback the image data to the terminal device. In the embodiments of the present application, the application configuring can be performed based on the link address of the target application. In comparison with the solution in which the service provider uploads various files to configure the cloud application, the cloud application can be configured more conveniently with improved processing efficiency in the embodiments of the present application.

DESCRIPTION OF EMBODIMENTS

In order to make the above-mentioned purposes, features and advantages of the present application more obvious and easy to understand, the present application is further described in detail below in combination with the accompanying drawings and specific implementations.

Embodiments of the present application can be applied to the field of cloud application configuration. According to a link address uploaded by a user, an installation file of a target application can be downloaded to make a mirror file of the target application, and a corresponding proxy node can be assigned to the mirror file to run the mirror file of the target application through the proxy node to provide a service of the target application to the user. In the embodiments of the present application, the cloud application can be configured based on the link address of the target application. In comparison with the solution in which the service provider uploads various files to configure the cloud application, the cloud application can be configured more conveniently in the solution of the embodiments of the present application. Cloud application is a concept of cloud computing technology and embodies the cloud computing technology at the application layer.

Figure 1:
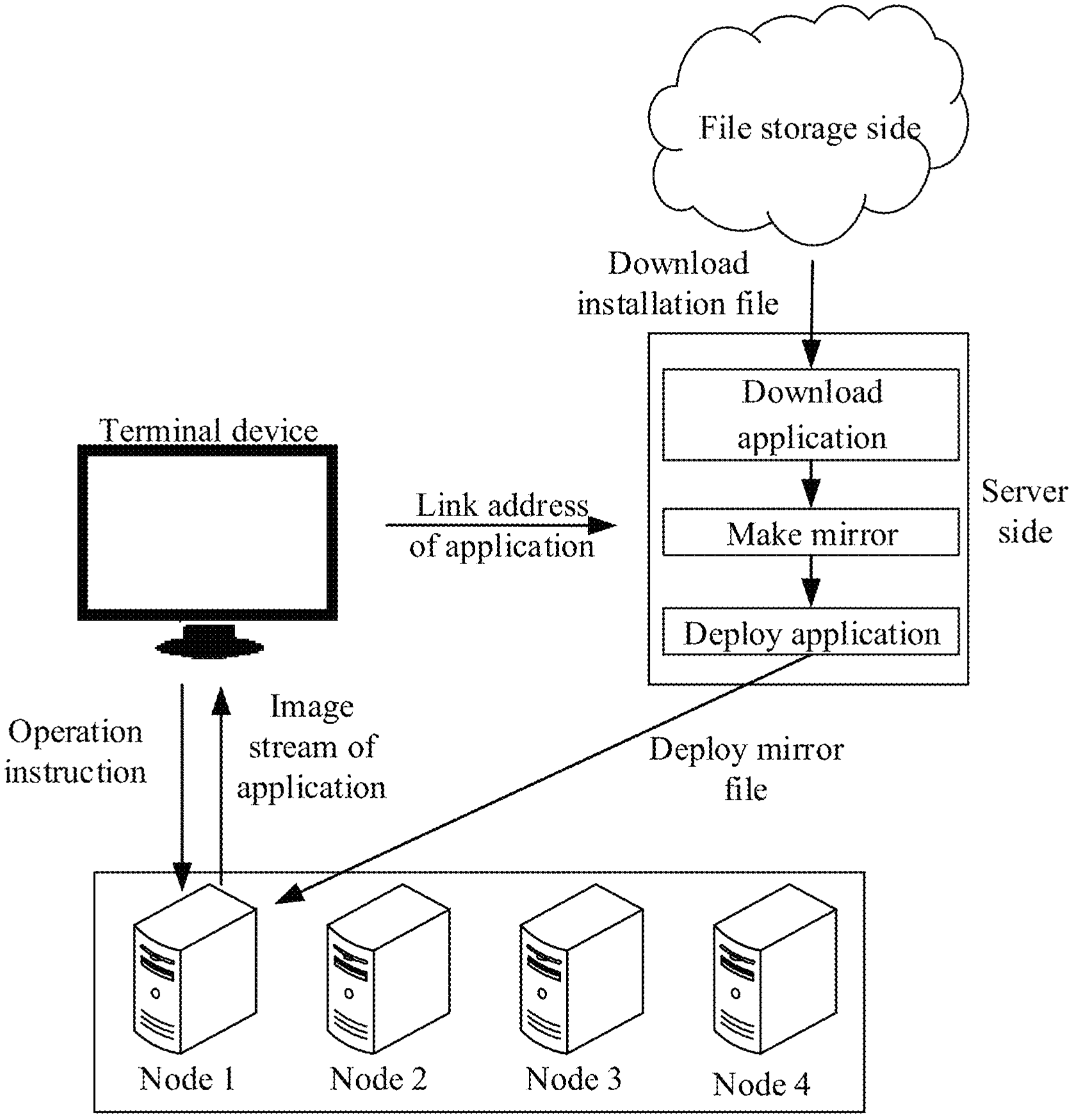
FIG. 1 is a schematic flow chart of a cloud application-based processing method according to an embodiment of the present application.

As shown in FIG. 1, an embodiment of the present application can be applied to a server side, the server side can interact with a terminal device, and the server side can download application files, make mirror files and deploy applications. The server side in the embodiment of the present application receives a link address uploaded by a user of the terminal device. In the terminal device in the embodiment of the present application, an address identification plug-in can be pre-set to identify link addresses related to applications in an interactive page of the terminal device based on the address identification plug-in, and display the link addresses in a link address table. The user can click a link address in the link address table for selection, thereby determining a selected target link address to upload the target link address to the server side. It should be noted that in addition to uploading the link address to the server side, the terminal device can also upload location information of the terminal device and device information of the terminal device to the server side. Based on the location information, the server side can decide a proxy node that provides services for the terminal device, and the proxy node can establish a connection with the terminal device based on the device information.

After receiving the link address of the target application, the server side can download an installation file from a file storage side based on the link address to make a mirror file. The installation file can also be called an installation package (Install pack), a software installation package, and an application installation package, which is a collection of self-extracting files and includes all files for installing the application. A mirror file refers to a single file into which a specific series of files are made in a certain format. In addition, the server side can also decide, based on a location of the terminal device, the proxy node (e.g., node 1 as shown in FIG. 1) that provides services to the terminal device, so as to deploy the mirror file of the target application to the proxy node, and provide services to the terminal device through the proxy node.

In the embodiment of the present application, after determining the mirror file of the target application and the proxy node of the target application, the server side can send the mirror file of the target application and the device information of the terminal device to the proxy node, and the proxy node instantiates the mirror file. Instantiation refers to a process of creating objects from a class in object-oriented programming and is a process of concretizing an abstract concept class to the physical objects of the class. The proxy node can establish a long connection between the proxy node and the terminal device based on the device information. The proxy node can receive an application operation instruction uploaded by the terminal device through the long connection, and determine processed image data based on the application operation instruction and the instantiated mirror file to form an image stream, so as to feedback the image stream to the terminal device through the long connection.

The embodiment of the present application can be applied to a scenario of cloud application configuration. In the embodiment of the present application, based on the link address of the application, the application installation file can be downloaded and the application mirror file can be made and deployed, so that the configuration of the cloud application can be completed more conveniently based on the link address. The embodiment of the present application can be applied to various scenarios of cloud application configuring. For example, according to the scenarios corresponding to the applications, the embodiment of the present application can be applied to communication applications, file processing applications, logistics-related applications, e-commerce-related applications, medical-related applications, transportation-related applications, etc. For another example, according to the operating environments corresponding to the applications, the embodiment of the present application can be applied to scenarios of mobile phone-related application configuring, scenarios of computer-related application configuring, and scenarios of tablet-related application configuring.

Figure 2:
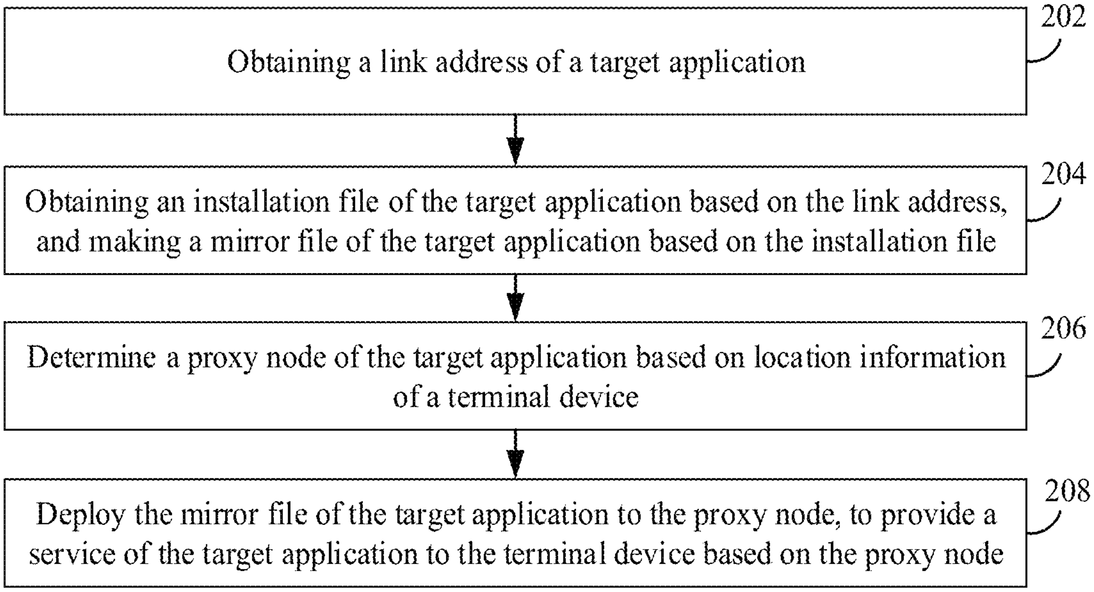
FIG. 2 is a schematic flow chart of a cloud application-based processing method according to another embodiment of the present application.

Based on the above embodiment, the embodiments of the present application further provide a data processing method, which can be applied to a server side. The server side can interact with a terminal device to receive a link address of a target application uploaded by the terminal device. Based on the link address, the server side downloads an installation file, makes a mirror file, and decides a proxy node, so as to deploy the target application to the proxy node, and provide services to the terminal device through the proxy node. Specifically, as shown in FIG. 2, the method includes the following steps.

Step 202, obtaining a link address of a target application.

Step 204, obtaining an installation file of the target application based on the link address, and making a mirror file of the target application based on the installation file.

In the terminal device of the embodiment of the present application, an address identification plug-in can be pre-set to identify link addresses related to applications in an interactive page of the terminal device based on the address identification plug-in, and display the link addresses in a link address table. The user can click a link address in the link address table for selection, thereby determining a selected target link address to upload the target link address to the server side. After receiving the link address, the server side can perform downloading based on the link address to obtain the installation file of the target application and make a corresponding mirror file.

In the embodiment of the present application, a first information library and a file library can be set in the server side. The file library is used to store installation files of the applications, and the first information library is used to store link addresses of the installation files of the file library. Correspondingly, before downloading the installation file based on the link address, the server side can matching the link address with the first information library, thereby determining whether to download a file based on the matching result. Specifically, as an embodiment, the method further includes: matching the link address of the target application to a link address in the first information library to determine first matching information, where the first information library stores link addresses of applications whose installation files have been downloaded; extracting the installation file of the target application from the file library based on the first matching information. When the link address of the target application does not match any link address in the first information library, the server side can obtain the installation file by downloading the installation file; when the link address of the target application matches a link address in the first information library, the first matching information can be determined, and the first matching information includes an address in the first information library that matches the link address of the target application, so as to retrieve the installation file based on the first matching information to obtain the installation file. It should be noted that in addition to storing the installation files in the file library, in the embodiment of the present application, mirror files of the applications can also be stored in the file library, so as to match the corresponding mirror file based on the first matching information.

The server side can further receive location information uploaded by the terminal device, so as to determine in step 206 the proxy node of the target application based on the location information of the terminal device. In the embodiment of the present application, based on a location of the terminal device, the proxy node closest to the terminal device can be determined as the proxy node of the target application. It should be noted that for different types of installation files, different operating environments are required. Therefore, in the embodiment of the present application, during screening the proxy node of the target application, it is also possible to determine the operating environment based on the type of the application, so as to screen out the proxy node that supports the operating environment. Specifically, as an embodiment, the determining the proxy node of the target application based on the location information of the terminal device includes: determining operating environment information based on application type information of the target application; and determining the proxy node of the target application based on the location information of the terminal device and the operating environment information. The target application may be an application corresponding to a mobile phone, a computer, or a tablet device. Accordingly, in the embodiment of the present application, the operating environment required by the target application can be determined based on the type of the application, and then the corresponding proxy node can be screened out based on the location of the terminal device and the operating environment, to provide the service of the target application.

After determining the proxy node, the server side can deploy in step 208 the mirror file of the target application to the proxy node to provide a service of the target application to the terminal device based on the proxy node.

The server side can send the mirror file of the target application and the device information of the terminal device to the proxy node. The proxy node determines the terminal device based on the device information and provides services to the terminal device based on the mirror file. Specifically, the proxy node can establish a long connection between the proxy node and the terminal device based on the device information. Through the long connection, the proxy node can receive an application operation instruction uploaded by the terminal device. The proxy node can further instantiate the mirror file of the target application, and determine processed image data based on the application operation instruction and the instantiated mirror file to form an image stream, so as to feedback the image stream to the terminal device through the long connection.

In the embodiment of the present application, the target application can be deploy on the proxy node to provide the service of the target application to the terminal device through the proxy node. In the embodiment of the present application, when a further relevant terminal device other than the terminal device (located near the terminal device) also requires the service of the target application, the service can be provided to the further relevant terminal device through the proxy node. Specifically, as an embodiment, the method further includes: matching the link address of the target application to a link address in a second information library to determine second matching information, where the second information library stores link addresses of applications whose the mirror files have been deployed; and extracting target proxy node information from a node information library based on the second matching information to determine the target proxy node, so as to provide the service of the target application to the terminal device based on the target proxy node.

In the embodiment of the present application, after the target application is deployed to the proxy node, a record can be made in the node information library and the link address of the target application can be stored in the second information library. Accordingly, in the embodiment of the present application, after the user uploads the link address to the server side through the terminal device, the link address can be matched with the second information library. In the embodiment of the present application, when the link address does not match the second information library, a process of downloading the installation file and making and deploying the mirror file can be executed; and when the link address matches the second information library, it can be determined that the target application has been downloaded and is running on the proxy node of the mirror file of the target application. Therefore, in the embodiment of the present application, the target proxy node can be retrieved and determined through the node information library, so as to provide services to the terminal device through the target proxy node.

Figure 3:
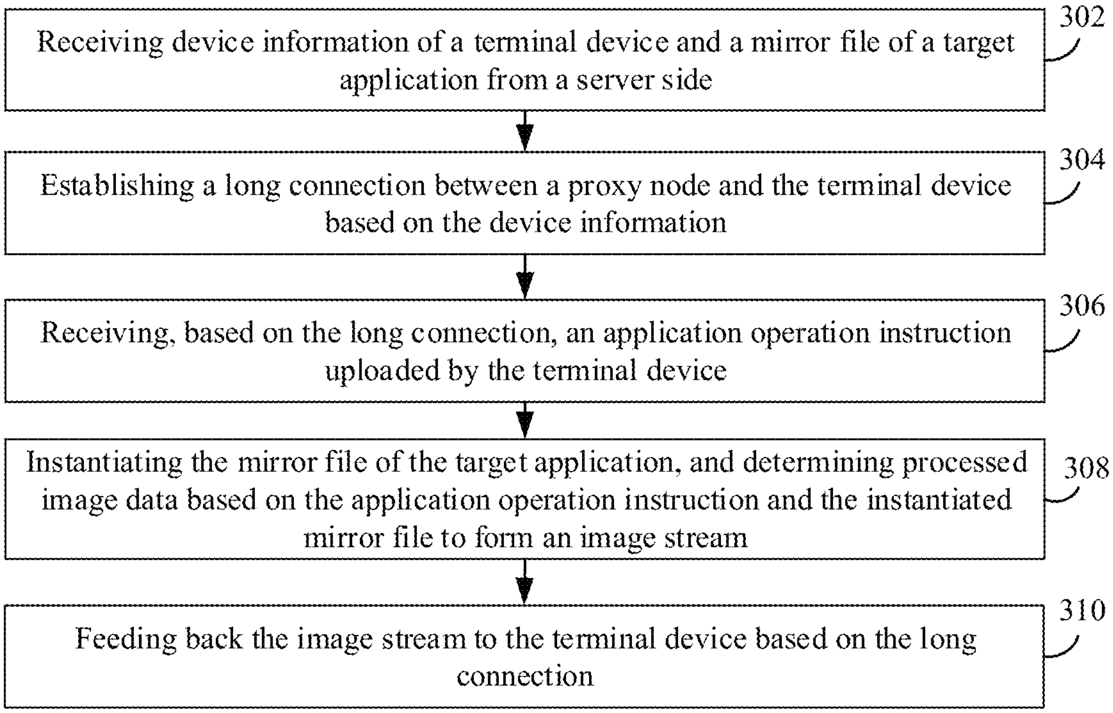
FIG. 3 is a schematic flow chart of a cloud application-based processing method according to another embodiment of the present application.

On the basis of the above embodiment, the embodiments of the present application further provide a cloud application-based processing method, which can be applied to a proxy node. The mirror file of the target application can be deployed on the proxy node to provide services to the terminal device through the proxy node. Specifically, as shown in FIG. 3, the method includes the following steps.

Step 302, receiving device information of a terminal device and a mirror file of a target application from a server side, where the mirror file of the target application is determined based on an installation file of the target application, and the installation file of the target application is obtained based on a link address of the target application.

Step 304, establishing a long connection between the proxy node and the terminal device based on the device information.

Step 306, receiving, based on the long connection, an application operation instruction uploaded by the terminal device.

Step 308, instantiating the mirror file of the target application, and determining processed image data based on the application operation instruction and the instantiated mirror file to form an image stream.

Step 310, feeding back the image stream to the terminal device based on the long connection. The image stream can also be called a video stream, and the image stream consists of at least one frame of image. In the embodiment of the present application, the image data can be fed back in real time in response to the instruction uploaded by the terminal device, so that the user of the terminal device can use the target application on the proxy node.

The implementation of this embodiment is similar to that of the above embodiment. For the specific implementation, reference can be made to the specific implementation of the above embodiment, and details will not be repeated here.

The embodiment of the present application can be applied to the proxy node. The proxy node can interact with the server side. The server side is connected to at least one proxy node. The server side can decide the target proxy node on which the target application needs to be deployed, and then send the mirror file of the target application and the device information of the terminal device to the proxy node. After receiving the information from the server side, the proxy node can establish a long connection between the proxy node and the terminal device based on the device information. Specifically, the proxy node can establish a long connection with a peripheral device of the terminal device, such as a mouse, a keyboard and other peripheral devices to receive an application operation instruction. The proxy node can further instantiate the mirror file of the target application, and determine processed image data based on the application operation instruction and the instantiated mirror file to form an image stream, and then feedback the image stream to the terminal device based on the long connection.

Figure 4:
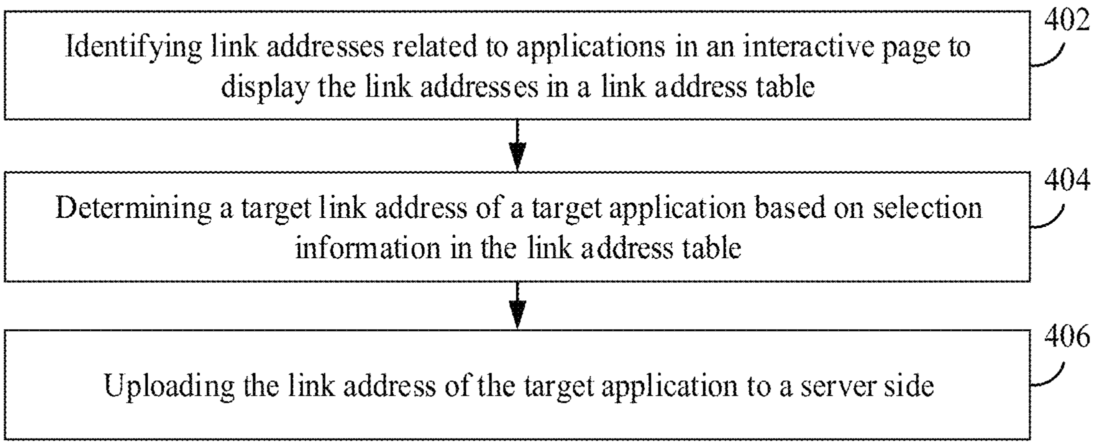
FIG. 4 is a schematic flow chart of a cloud application-based processing method according to another embodiment of the present application.

On the basis of the above-mentioned embodiments, the embodiments of the present application further provide a cloud application-based processing method, which can be applied to a terminal device. The user can operate on the terminal device to upload the link address of the application to the server side. Based on the link address, the server side executes the process of downloading the installation file, making the mirror file and deploying the mirror file in the proxy node, so as to provide the service of the target application to the terminal device through the proxy node. Specifically, as shown in FIG. 4, the method includes the following steps.

Step 402, identifying link addresses related to applications in an interactive page to display the link addresses in a link address table.

Step 404, determining a target link address of a target application based on selection information in the link address table.

Step 406, uploading the target link address of the target application to a server side, so that the server side obtains an installation file of the target application based on the target link address, and makes a mirror file of the target application, so as to deploy the mirror file of the target application to a target proxy node, and provide a service of the target application to the terminal device through the target proxy node. In the embodiment of the present application, the terminal device can upload at least one of location information and device information to the server side. Specifically, as an embodiment, the method further includes at least one of the following steps: uploading location information of the terminal device to the server side so that the server side determines the target proxy node based on the location information; uploading device information of the terminal device to the server side so that the server side sends the device information to the target proxy node so that the target proxy node establishes a long connection with the terminal device based on the device information to provide the service of the target application based on the long connection.

The user can operate on the terminal device to transmit an application operation instruction for the target application to the proxy node so as to run the application on the proxy node to form an image stream, and the proxy node can provide the image stream of the target application to the terminal device. Specifically, as an embodiment, the method further includes: establishing a long connection between the terminal device and the proxy node; uploading an application operation instruction to the proxy node based on the long connection so that the proxy node determines processed image data based on the application operation instruction and the instantiated mirror file to form an image stream; and receiving, based on the long connection, the image stream fed back by the proxy node and displaying the image stream.

The implementation of this embodiment is similar to the implementations of the above embodiments. For the specific implementation, reference can be made to the specific implementations of the above embodiments, and details will not be repeated here.

The embodiment of the present application can be applied to a terminal device, which can interact with a server side. In the embodiment of the present application, a plug-in can be configured in the terminal device to identify the link addresses related to the applications in the interactive page of the terminal device through the plug-in, and then display the link addresses in the link address table. The user can make a selection in the link address table, so as to upload the selected target link address of the target application to the server side. The server side can obtain the installation file of the target application based on the link address and make the mirror file of the target application. It is also possible for the server side to determine the proxy node of the target application based on the location information of the terminal device, and deploy the mirror file of the target application to the proxy node to provide the service of the target application to the terminal device based on the proxy node. The proxy node can establish a connection with the terminal device to receive an instruction for the target application from the terminal device, and perform processing based on the instruction and the mirror file of the target application to form an image stream to feed back the image stream to the terminal device.

It should be noted that for the method embodiments, for the sake of simple description, they are all expressed as a combination of a series of actions, but those skilled in the art should know that the embodiments of the present application are not limited by the described action sequence, because according to the embodiments of the present application, some steps can be performed in other sequences or simultaneously. Secondly, those skilled in the art should also know that the embodiments described in the specification are all preferred embodiments, and the actions involved are not necessarily required by the embodiments of the present application.

Figure 5:
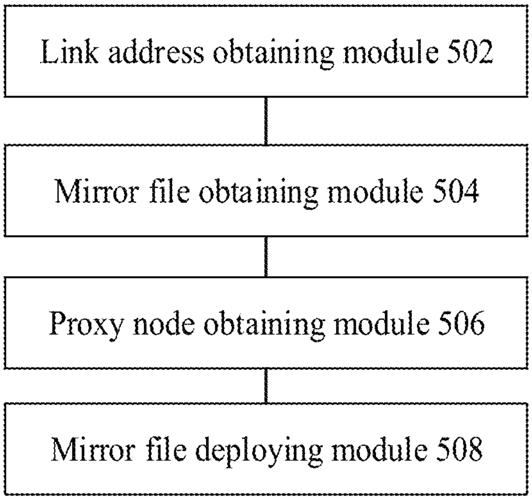
FIG. 5 is a schematic structural diagram of a cloud application-based processing apparatus according to an embodiment of the present application.

Based on the above embodiments, this embodiment further provides a cloud application-based processing apparatus. Referring to FIG. 5, the apparatus can specifically include the following modules:

a link address obtaining module 502 configured to obtain a link address of a target application;

a mirror file obtaining module 504 configured to obtain an installation file of the target application based on the link address, and make a mirror file of the target application based on the installation file;

a proxy node obtaining module 506 configured to determine a proxy node of the target application based on location information of a terminal device; and a mirror file deploying module 508 configured to deploy the mirror file of the target application to the proxy node to provide a service of the target application to the terminal device based on the proxy node.

The embodiment of the present application can be applied to an electronic device of a server side. The server side can interact with the terminal device to obtain the link address of the target application from the terminal device, and then obtain the installation file of the target application based on the link address, and make the mirror file of the target application. The server side can further determine the proxy node of the target application based on the location information of the terminal device, and deploy the mirror file of the target application to the proxy node to provide the service of the target application to the terminal device based on the proxy node. The proxy node can establish a connection with the terminal device to receive an instruction for the target application from the terminal device, and perform processing based on the instruction and the mirror file of the target application to form image data to feedback the image data to the terminal device. In the embodiment of the present application, the cloud application can be configured based on the link address of the target application. In comparison with the solution in which the service provider uploads various files for configuring the cloud application, in the solution of the embodiment of the present application, the cloud application can be configured more conveniently.

Figure 6:
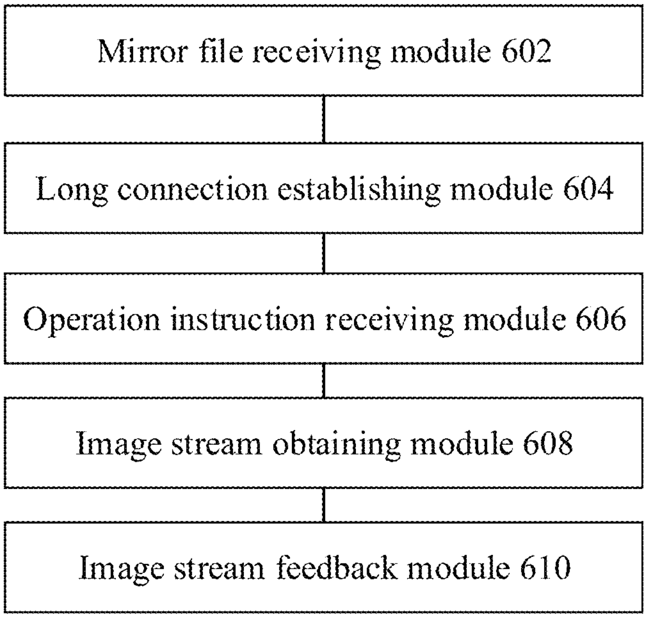
FIG. 6 is a schematic structural diagram of a cloud application-based processing apparatus according to another embodiment of the present application.

On the basis of the above-mentioned embodiments, this embodiment further provides a cloud application-based processing apparatus. Referring to FIG. 6, the apparatus may specifically include the following modules:

a mirror file receiving module 602 configured to receive device information of a terminal device and a mirror file of a target application from a server side, where the mirror file of the target application is determined based on an installation file of the target application, and the installation file of the target application is obtained based on a link address of the target application;

a long connection establishing module 604 configured to establish a long connection between a proxy node and the terminal device based on the device information;

an operation instruction receiving module 606 configured to receive, based on the long connection, an application operation instruction uploaded by the terminal device;

an image stream obtaining module 608 configured to instantiate the mirror file of the target application, and determine processed image data based on the application operation instruction and the instantiated mirror file to form an image stream; and an image stream feedback module 610 configured to feedback the image stream to the terminal device based on the long connection.

The embodiment of the present application can be applied to an electronic device of the proxy node. The proxy node can interact with the server side. The server side is connected to at least one proxy node. The server side can decide the target proxy node on which the target application needs to be deployed, and then send the mirror file of the target application and the device information of the terminal device to the target proxy node. After receiving the information from the server side, the target proxy node can establish a long connection between the proxy node and the terminal device based on the device information. Specifically, the proxy node can establish a long connection with a peripheral device of the terminal device, such as a mouse, a keyboard and other peripheral devices to receive the application operation instruction. The proxy node can further instantiate the mirror file of the target application, and determine processed image data based on the application operation instruction and the instantiated mirror file to form an image stream, and then feedback the image stream to the terminal device based on the long connection.

Figure 7:
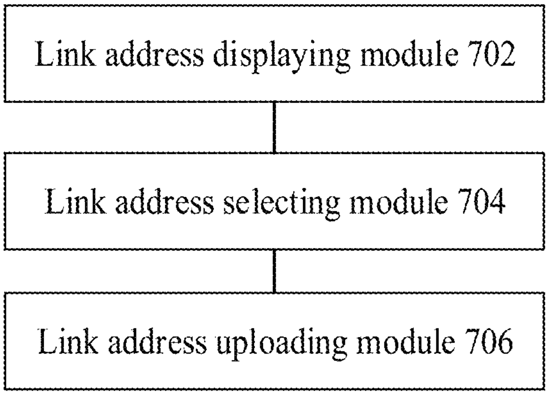
FIG. 7 is a schematic structural diagram of a cloud application-based processing apparatus according to another embodiment of the present application.

Based on the above embodiments, this embodiment further provides a cloud application-based processing apparatus. Referring to FIG. 7, the apparatus can specifically include the following modules:

a link address displaying module 702 configured to identify link addresses related to applications in an interactive page to display the link addresses in a link address table;

a link address selecting module 704 configured to determine a target link address of a target application based on selection information in the link address table;

a link address uploading module 706 configured to upload the target link address of the target application to a server side, so that the server side can obtain an installation file of the target application based on the target link address, and make a mirror file of the target application, so as to deploy the mirror file of the target application to a target proxy node, and provide a service of the target application to the terminal device through the target proxy node.

In summary, the embodiment of the present application can be applied to the terminal device, and the terminal device can interact with the server side. In the embodiment of the present application, a plug-in can be configured in the terminal device to identify the link addresses related to the applications in the interactive page of the terminal device through the plug-in, and then display the link addresses in the link address table. The user can make a selection in the link address table, so as to upload the selected target link address of the target application to the server side and, based on the link address, the server side can obtain the installation file of the target application and make the mirror file of the target application. The server side can further determine the proxy node of the target application based on the location information of the terminal device, and deploy the mirror file of the target application to the proxy node, so as to provide the service of the target application to the terminal device based on the proxy node. The proxy node can establish a connection with the terminal device to receive the instruction for the target application from the terminal device, and perform processing based on the instruction and the mirror file of the target application to form an image stream to feed back the image stream to the terminal device.

Embodiments of the present application further provide a non-volatile readable storage medium, which stores one or more modules (programs). When the one or more modules are applied to a device, the device can be caused to execute the instructions of the method steps in the embodiments of the present application.

Embodiments of the present application provide one or more machine-readable media having instructions stored thereon, and when the instructions are executed by one or more processors, an electronic device is caused to implement one or more methods described in the above embodiments. In the embodiment of the present application, the electronic device includes a server, a terminal device or other devices.

Figure 8:
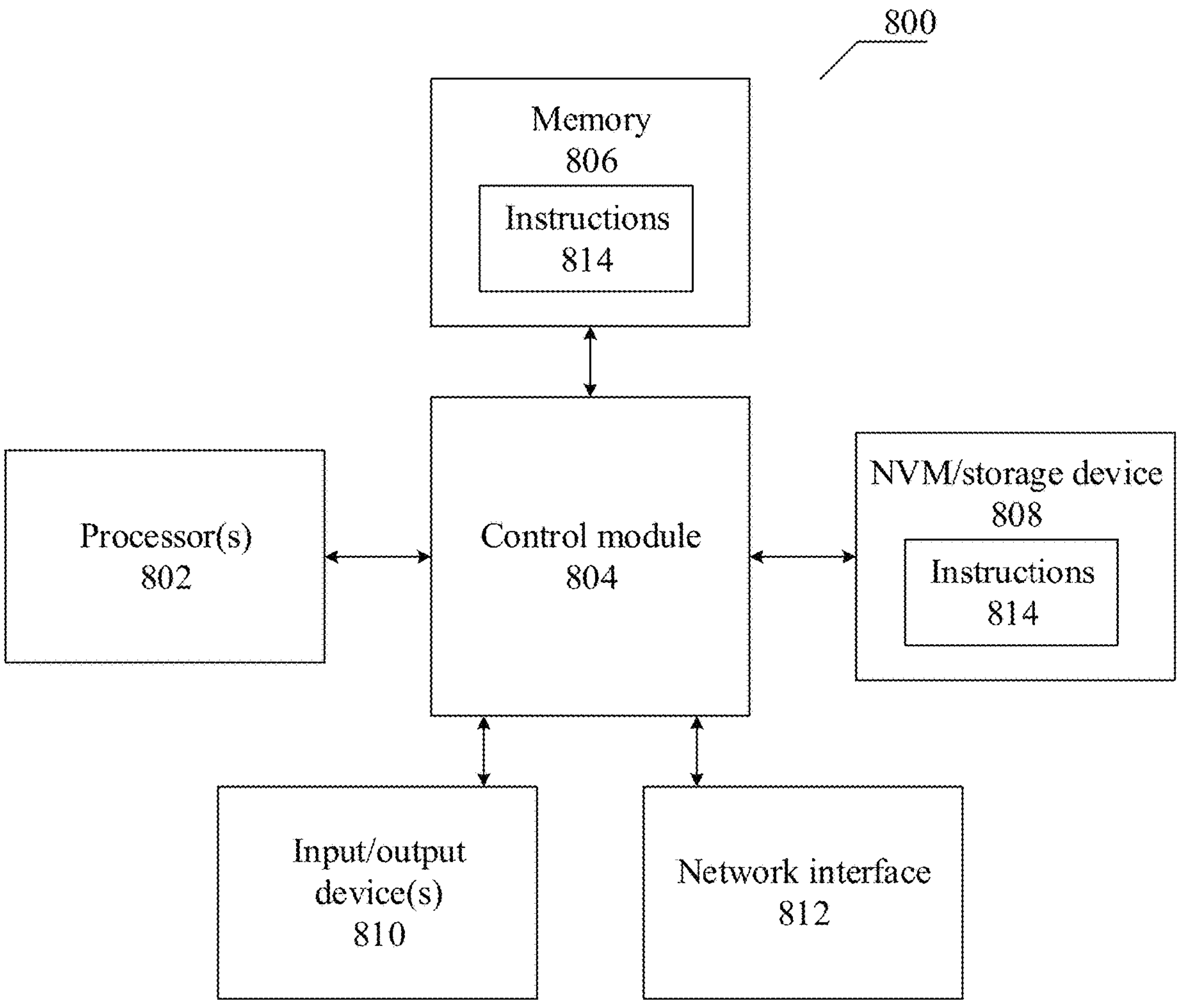
FIG. 8 is a schematic structural diagram of an example apparatus according to an embodiment of the present application.

An embodiment of the present disclosure can be implemented as an apparatus that uses any appropriate hardware, firmware, software, or any combination thereof to perform the desired configuration, and the apparatus may include electronic devices such as a server (cluster), a terminal and the like. FIG. 8 schematically shows an example apparatus 800 that can be used to implement the various embodiments described in the present application.

For one embodiment, FIG. 8 shows the example apparatus 800, which has one or more processors 802, a control module (chipset) 804 coupled to at least one of the (one or more) processors 802, a memory 806 coupled to the control module 804, a non-volatile memory (NVM)/storage device 808 coupled to the control module 804, one or more input/output devices 810 coupled to the control module 804, and a network interface 812 coupled to the control module 804.

The processors 802 may include one or more single-core or multi-core processors, and the processors 802 may include any combination of a general-purpose processor or a special-purpose processor (e.g., a graphics processor, an application processor, a baseband processor, etc.). In some embodiments, the apparatus 800 can be used as a device such as the server side, the terminal, etc. described in the embodiments of the present application.

In some embodiments, the apparatus 800 may include one or more computer-readable media (e.g., memory 806 or NVM/storage device 808) having instructions 814 and one or more processors 802 that are combined with the one or more computer-readable media and configured to execute the instructions 814 to implement modules to perform the actions described in the present disclosure.

For one embodiment, the control module 804 may include any suitable interface controller to provide any suitable interface to at least one of the processor(s) 802 and/or any suitable device or component in communication with the control module 804.

The control module 804 may include a memory controller module to provide an interface to the memory 806. The memory controller module may be a hardware module, a software module, and/or a firmware module.

The memory 806 may be used, for example, to load and store data and/or the instructions 814 for the apparatus 800. For one embodiment, the memory 806 may include any suitable volatile memory, such as a suitable dynamic random access memory (DRAM). In some embodiments, the memory 806 may include a double data rate-type four synchronous dynamic random access memory (DDR4 SDRAM).

For one embodiment, the control module 804 may include one or more input/output controllers to provide an interface to the NVM/storage device 808 and the input/output device (s) 810.

For example, the NVM/storage device 808 can be used to store data and/or the instructions 814. The NVM/storage device 808 may include any suitable non-volatile memory (e.g., flash memory) and/or may include any suitable non-volatile storage device(s) (e.g., one or more hard disk drives (HDDs), one or more compact disk (CD) drives, and/or one or more digital versatile disk (DVD) drives).

The NVM/storage device 808 may include storage resources that are part of a device on which the apparatus 800 is installed, or may be accessible to the device without being part of the device. For example, the NVM/storage device 808 may be accessible through a network via the input/output device(s) 810.

Input/output device(s) 810 may provide the interface(s) for the apparatus 800 to communicate with any other suitable device, and the input/output device 810 may include a communication component, an audio component, a sensor component, etc. The network interface 812 may provide an interface for the apparatus 800 to communicate through one or more networks, and the apparatus 800 may wirelessly communicate with one or more components of the wireless network according to any of one or more wireless network standards and/or protocols, such as accessing a wireless network based on a communication standard, such as WiFi, 2G, 3G, 4G, 5G, etc., or a combination thereof for wireless communication.

For one embodiment, at least one of the (one or more) processors 802 may be packaged together with the logic of one or more controllers (e.g., a memory controller module) of the control module 804. For one embodiment, at least one of the (one or more) processors 802 may be packaged together with the logic of one or more controllers of the control module 804 to form a system-in-package (SiP). For one embodiment, at least one of the (one or more) processors 802 may be integrated on the same die with the logic of one or more controllers of the control module 804. For one embodiment, at least one of the (one or more) processors 802 may be integrated on the same die with the logic of one or more controllers of the control module 804 to form a system-on-chip (SoC).

In various embodiments, the apparatus 800 may be, but is not limited to, a terminal device such as a server, a desktop computing device, or a mobile computing device (e.g., a laptop computing device, a handheld computing device, a tablet computer, a netbook, etc.). In various embodiments, the apparatus 800 may have more or fewer components and/or different architectures. For example, in some embodiments, the apparatus 800 includes one or more cameras, a keyboard, a liquid crystal display (LCD) screen (including a touch screen display), a non-volatile memory port, multiple antennas, a graphics chip, an application-specific integrated circuit (ASIC), and a speaker.

A main control chip can be used as a processor or a control module in a detection device, and the sensor data, location information, etc. are stored in a memory or the NVM/storage device. The sensor group can be used as an input/output device, and the communication interface may include a network interface.

Embodiments of the present application further provide an electronic device, including: a processor; and a memory having executable codes stored thereon, where when the executable codes are executed, the processor is caused to implement one or more methods described in the embodiments of the present application.

Embodiments of the present application further provide one or more machine-readable media having executable codes stored thereon, where when the executable codes are executed, a processor is caused to implement one or more methods described in the embodiments of the present application.

As for the apparatus embodiments, since they are basically similar to the method embodiments, the description is relatively simple, and reference for the relevant parts can be made to the partial description of the method embodiments.

The embodiments in this specification are described in a progressive manner, and each embodiment focuses on the differences from other embodiments. Reference for the same and similar parts between the embodiments can be made to each other.

The embodiments of the present application are described with reference to the flowcharts and/or block diagrams of the methods, terminal devices (systems), and computer program products according to the embodiments of the present application. It should be understood that each process in the flowchart and/or a box in the block diagram, as well as the combination of the processes in the flowchart and/or boxes in the block diagram can be implemented by computer program instructions. These computer program instructions can be provided to a processor of a general-purpose computer, a special-purpose computer, an embedded processor or other programmable data processing terminal device to generate a machine, so that the instructions executed by the processor of the computer or other programmable data processing terminal device generate an apparatus for implementing one or more processes in the flowchart and/or the functions specified in one or more boxes in the block diagram.

These computer program instructions may also be stored in a computer-readable memory that can guide a computer or other programmable data processing terminal device to work in a specific manner, so that the instructions stored in the computer-readable memory produce a product including an instruction apparatus, which implements one or more processes of the flowchart and/or the functions specified in one or more boxes of the block diagram.

These computer program instructions may also be loaded onto a computer or other programmable data processing terminal device, so that a series of operation steps are performed on the computer or other programmable terminal device to produce a computer-implemented process, so that the instructions executed on the computer or other programmable terminal device provide steps for implementing one or more processes of the flowchart and/or the functions specified in one or more boxes of the block diagram.

Although the preferred embodiments of the embodiments of the present application have been described, those skilled in the art may make additional changes and modifications to these embodiments once they learn the basic creative concepts. Therefore, the attached claims are intended to be interpreted as including the preferred embodiments and all changes and modifications that fall within the scope of the embodiments of the present application.

Finally, it should further be noted that herein relational terms such as "first" and "second", etc. are only used to distinguish one entity or operation from another entity or operation, and do not necessarily require or imply any existence of such actual relationship or order between these entities or operations. Moreover, the terms "include", "comprise" or any other variants thereof are intended to cover non-exclusive inclusion, so that a process, a method, an article or a terminal device including a series of elements includes not only those elements, but also other elements not explicitly listed, or also includes elements inherent to such process, method, article or terminal device. In the absence of further restrictions, the elements defined by the sentence "including one . . . " do not exclude the existence of other identical elements in the process, method, article or terminal device including the elements.

Detailed introductions have been made to the cloud application-based processing method, the cloud application-based processing apparatus, the electronic device and the storage medium provided by the present application. Specific examples are used herein to illustrate the principles and implementations of the present application. The description of the above embodiments is only used to help understand the methods and the core idea of the present application; at the same time, for those skilled in the art, according to the idea of the present application, there will be changes in the specific implementations and the application scope. In summary, the content of this specification should not be understood as a limitation on the present application.

The invention claimed is:

1. A cloud application-based processing method, applied to a server side, wherein the method comprises:
- obtaining a link address of a target application;
- determining whether the link address of the target application matches a link address in a second information library;
- when the link address of the target application matches the link address in the second information library, determining second matching information, wherein the second information library stores link addresses of applications whose mirror files have been deployed;
- extracting target proxy node information from a node information library based on the second matching information to determine a target proxy node, to enable the target proxy node to provide a service of the target application to the terminal device;
- when the link address of the target application does not match the link address in the second information library, obtaining an installation file of the target application based on the link address, and making a mirror file of the target application based on the installation file;
- determining a proxy node of the target application based on location information of a terminal device; and
- deploying the mirror file of the target application to the proxy node of the target application, to enable the proxy node of the target application to provide the service of the target application to the terminal device.

2. The method according to claim 1, further comprising:
- determining whether the link address of the target application matches a link address in a first information library;
- when the link address of the target application matches the link address in the first information library, determining first matching information, wherein the first information library stores link addresses of applications whose installation files have been downloaded;
- extracting the installation file of the target application from a file library based on the first matching information; and when the link address of the target application does not match the link address in the first information library, downloading and obtaining the installation file of the target application.

3. The method according to claim 1, wherein the determining the proxy node of the target application based on the location information of the terminal device comprises:

determining operating environment information based on application type information of the target application; and determining the proxy node of the target application based on the location information of the terminal device and the operating environment information.

4. An electronic device, comprising:

a processor; and a memory having executable codes stored thereon, wherein when the executable codes are executed by the processor, the method according to claim 1 is implemented.

5. A non-transitory machine-readable media having executable codes stored thereon, wherein when the executable codes are executed by a processor, the method according to claim 1 is implemented.

6. A cloud application-based processing method, applied to a proxy node, wherein the method comprises:

receiving device information of a terminal device and a mirror file of a target application from a server side, wherein the mirror file of the target application is determined based on an installation file of the target application, and the installation file of the target application is obtained based on a link address of the target application;

establishing a long connection between the proxy node and the terminal device based on the device information;

receiving, based on the long connection, an application operation instruction uploaded by the terminal device;

instantiating the mirror file of the target application, and determining processed image data based on the application operation instruction and the instantiated mirror file to form an image stream; and feeding back the image stream to the terminal device based on the long connection.

7. An electronic device, comprising:

a processor; and a memory having executable codes stored thereon, wherein when the executable codes are executed by the processor, the method according to claim 6 is implemented.

8. A cloud application-based processing method, applied to a terminal device, wherein the method comprises:

identifying link addresses related to applications in an interactive page, to display the link addresses in a link address table;

determining a target link address of a target application based on selection information in the link address table; and uploading the target link address of the target application to a server side, so that the server side obtains an installation file of the target application based on the target link address, and makes a mirror file of the target application, so as to deploy the mirror file of the target application to a target proxy node, and provide a service of the target application to the terminal device through the target proxy node;

wherein the method further:

uploading device information of the terminal device to the server side, so that the server side sends the device information to the target proxy node, so that the target proxy node establishes a long connection with the terminal device based on the device information, to provide the service of the target application based on the long connection.

9. The method according to claim 8, further comprising:

uploading location information of the terminal device to the server side, so that the server side determines the target proxy node based on the location information.

10. The method according to claim 8, further comprising:

establishing a long connection between the terminal device and the target proxy node;

uploading an application operation instruction to the target proxy node based on the long connection, so that the target proxy node determines processed image data based on the application operation instruction and an instantiated mirror file to form an image stream; and receiving, based on the long connection, the image stream fed back by the target proxy node and displaying the image stream.

11. An electronic device, comprising:

a processor; and a memory having executable codes stored thereon, wherein when the executable codes are executed by the processor, the method according to claim 8 is implemented.

12. A non-transitory machine-readable media having executable codes stored thereon, wherein when the executable codes are executed by a processor, the method according to claim 6 is implemented.

13. A non-transitory machine-readable media having executable codes stored thereon, wherein when the executable codes are executed by a processor, the method according to claim 8 is implemented.

* * * * *